Figure 1:
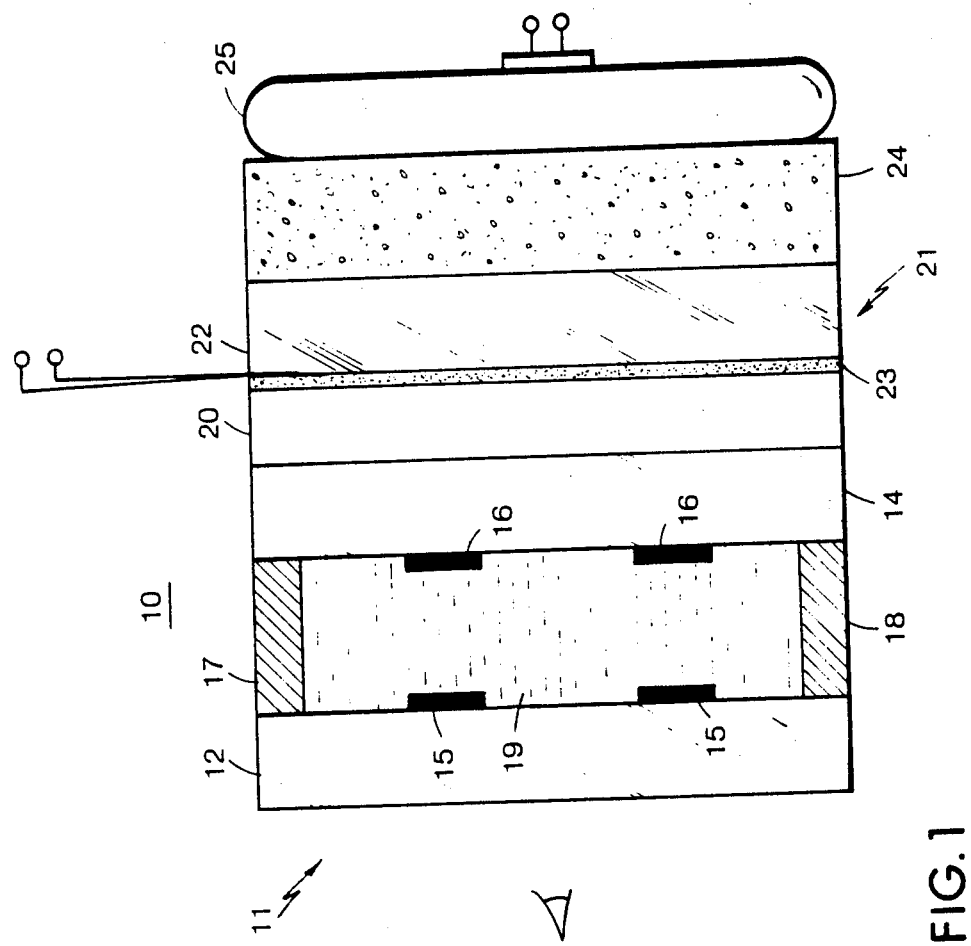

United States Patent [19]

Haim

[11] Patent Number: 4,643,525
[45] Date of Patent: Feb. 17, 1987

[54] TRANSFLECTIVE LIQUID CRYSTAL DISPLAY WITH INTEGRAL HEATING UNIT

[75] Inventor: Elias S. Haim, Windham, N.H.

[73] Assignee: General Electric Co., Schenectady, N.Y.

[21] Appl. No.: 686,066

[22] Filed: Dec. 24, 1984

[51] Int. Cl.$^4$ .............................................. G02F 1/13
[52] U.S. Cl. ........................... 350/331 R; 350/331 T; 350/345
[58] Field of Search ................ 350/331 T, 331 R, 345

[56] References Cited

U.S. PATENT DOCUMENTS 4,206,501  6/1980  Brooks .................. 350/331 T X

FOREIGN PATENT DOCUMENTS

| 24483 | 3/1981 | European Pat. Off. | 350/331 T |
| 54-123050 | 9/1979 | Japan | 350/331 T |
| 57-192927 | 11/1982 | Japan | 350/331 T |
| 58-106524 | 6/1983 | Japan | 350/331 T |

Primary Examiner—John K. Corbin
Assistant Examiner—Richard F. Gallivan
Attorney, Agent, or Firm—I. D. Blumenfeld

[57] ABSTRACT

A heated transflective liquid crystal display device has the heating element positioned behind the transflector to keep the heater out of the reflective light path. This construction significantly improves brightness of the display in the reflective mode.

This invention relates to liquid crystal device, and more particularly to liquid crystal displays incorporating a heating unit.

While the instant invention will be described in the context of cell of the guest-host variety, the invention is by no means limited thereto. The invention is equally applicable and useful in liquid crystal display utilizing a liquid crystal solution of the twisted nematic type and suitable polarizers.

6 Claims, 1 Drawing Figure

ID. 4,643,525

TRANSFLECTIVE LIQUID CRYSTAL DISPLAY WITH INTEGRAL HEATING UNIT

BACKGROUND OF THE INVENTION

It is well known to utilize liquid crystal displays which operate in either a reflective or in a transmissive mode. In the former case, incident light entering the front of the display passes through the liquid crystal solution to a reflective element positioned behind the cell. The light is reflected back through the display to the viewer. In transflective devices the display may be operated in both the reflective and the transmissive mode. To this end a light source is positioned behind the reflective element. In the transmissive mode the light source is energized to transmit light from the back of the cell to the front.

In both reflective and transflective liquid crystal devices it may be desirable to incorporate a resistive heating element in those applications where the display is exposed to low temperature. The resistive heating element and a temperature sensing element such as a thermistor, when positioned in the vicinity of the display, form a combination to energize the heating element whenever the temperature falls below a predetermined trip point. However, when the resistive heating element is incorporated directly onto the liquid crystal cell, as for example by depositing a resistive coating on the rear surface of the LCD back glass, a problem is encountered when the cell is illuminated in the reflective mode because the ambient light from the front of the cell must pass through the resistive coating twice resulting in both a significant reduction in brightness and in a potential color change.

Accordingly, it is highly desirable to provide a heated liquid crystal display in which the heating element is so positioned so as not to have any deleterious effects on brightness and color when the cell is operated in the reflective mode.

BRIEF SUMMARY OF THE INVENTION

In accordance with the invention, a liquid crystal display assembly, preferably of the guest-host type, has a transflective element positioned behind the cell. A heating element consisting of a glass substrate and a resistive layer is positioned between the transflector and the rear lighting source. The heating element is energized to heat the liquid crystal cell whenever the temperature of the cell drops below a predetermined temperature trip point which is higher than the minimum cell operating temperature.

Accordingly, it is an objective of the present invention to provide a novel liquid crystal display incorporating a heating element which does not affect the reflective light path.

The novel features which are believed to be characteristic of this invention are set forth in the appended claims. The invention itself, however, both as to its organization and mode of operation, together with further objectives and advantages thereof may best be understood by reference to the following description taken in connection with the accompanying drawing in which the FIG. 1 is a sectional view of a liquid crystal display device incorporating the heater structure of the invention.

FIG. 1 shows a transflective liquid crystal display which includes a liquid crystal cell 11 having a front substrate 12 and a rear substrate 14 of a substantially transparent material, such as glass or the like. Deposited on the interior surfaces of the front and rear substrates are optically transmissive, conductive electrodes segments 15 and 16. As is well known in the art, the electrodes 15 and 16 may be fabricated of indium oxide, tin oxide, indium tin oxide (with the latter being preferred) and the like. The front and rear plates of the cell are sealed by means of the sealing plug elements 17 and 18 to form a chamber which contains liquid crystal solution 19. Liquid crystal solution 19 is preferably one in which a dichroic dye or combination of dyes is a guest in a liquid crystal host material of the cholesteric type. The solution also includes an optically active material whereby the host liquid crystal molecules assume a helical orientation with the molecule substantially parallel and twisted with respect to the cell walls in the absence of an electric field.

Electrodes 15 and 16 are connected through suitable leads and a switching means, not shown, to a voltage source. With the switching means open, the liquid crystal material molecules assume their normal helical orientation. The long axes of the dichroic molecules are aligned helically and parallel to the substrate surface so that light passing through the cell is essentially absorbed by the dye molecules. Upon activation of the electrodes, by closing of the switch to the power supply, an electric field is established between the electrode segments to which voltage is applied and the liquid crystal molecules in between those electrodes assume a homeotropic order with their long axes substantially perpendicular the plane of the front and rear electrode; i.e., the helix unwinds. The guest dye molecules also align themselves in a homeotropic order with their long axes perpendicular to the plane of the electrodes and in this orientation permit light to pass. Thus, light is permitted to pass in the energized sections presenting a series of indicia or symbols against dark background.

Positioned immediately behind rear substrate 14 of cell 11 is a transflector 20 which has a high degree of reflectance, (typically 90 to 95%) and a low degree of transmittance, (typically 5 to 10% of the light impinging thereon). Transflector 20 may be constructed in a variety of ways. One form is a transparent glass substrate having a white barium sulfate coating (as for example barium sulfate of the type sold by Kodak under its trade designation 6080 white reflectance coating). The barium sulfate is deposited on the glass substrate as a slurry in water or alcohol solvent. The slurry is dried by heat and then a white acrylic lacquer sealing coating is sprayed over the white barium sulfate layer. Alternately, synthetic fiber paper of polypropylene or the like may be utilized as a transflector. One form of such a synthetic polypropylene fiber paper is available from the Munising Division of Kimberly-Clark Corporation under its trade designation Kimdura.

Positioned behind transflector 20 and thus out of the reflective light path when the cell is operated in the reflective mode is a heater element 21 comprising of a transparent glass substrate 22 having a resistive layer 23 deposited on the front surface. Resistive layer 23 may be metallic or it may be a polymeric resistive material.

Polymeric resistive materials are readily available from a number of vendors. Examples of such vendors are:

Deposition Technology, Inc., 8963 Carrol Way San Diego, Calif. 92121;

Minco Transfoil Heaters, 7300 Commerce Lane Minneapolis, Minn. 55432;

Southwall Technologies, 1029 Corporation Way Palo Alto, Calif. 94303;

although the list is by no means exhaustive. Leads are attached to the resistive layer to permit current flow for heating purposes. The back of the heating element is positioned directly against a light diffusing element 24 which abuts directly against the front of a light source 25 which may be a planar electroluminescent device as shown or which may utilize alternate light sources such as incandescent lamps. With the construction shown in FIG. 1, it can be seen that a heating element is in heat exchange relationship with the rear of cell 11.

It will be realized that a very effective heating arrangement for the liquid crystal, system has been provided in which the heater element does not deleteriously affect the cell during the reflective mode operation.

While the instant invention has been described in connection with the preferred embodiments thereof, the invention is by no means limited thereto since other modifications of the instrumentalities employed may be made and forwarded in the scope of the invention. It is contemplated by the appended claims to cover any such modifications as fall within the true scope and spirit of the invention.

What we claim as new and desire to secure by Letters Patent of the United States is:

1. In a heated liquid crystal display the combination comprising:

(a) A liquid crystal cell containing a liquid crystal solution,
   (b) Reflector means positioned behind said cell to reflect light entering the light in front of the cell back through the cell,
   (c) Heating means located outside the reflective light path and positioned to be in heat exchanging relationship with the rear of said cell for maintaining the temperature of the solution above the minimal operating temperature of the solution,
   (d) Said heating means comprises a substrate and a heating element on the surface of the substrate in contact with the reflector means.

2. The heated liquid crystal display according to claim 1 including a light source positioned behind said heating means and wherein said reflector means is a transflective means located behind said cell for selectively operating the said display in the transmissive mode.

3. The heated liquid crystal display according to claim 2 including a light diffusing element positioned between said light source and the rear of said heating element.

4. The heated liquid crystal display according to claim 3 wherein said diffusing element contacts the rear of said heating element.

5. The heated liquid crystal display according to claim 2 wherein said substrate is an optically transparent material to permit transmission of light from said source during the transmissive mode.

6. The heated liquid crystal display according to claim 1 wherein said liquid crystal solution is a guest-host solution including an optically active material.

* * * * *